(12) United States Patent
Itakura

(10) Patent No.: US 9,471,056 B2
(45) Date of Patent: Oct. 18, 2016

(54) NUMERICAL CONTROL UNIT HAVING SCREEN DISPLAY SWITCHING FUNCTION FOLLOWING NC PROGRAM

(71) Applicant: FANUC Corporation, Minamitsuru-gun, Yamanashi (JP)

(72) Inventor: Shinichirou Itakura, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 317 days.

(21) Appl. No.: 14/306,560

(22) Filed: Jun. 17, 2014

(65) Prior Publication Data
US 2014/0379118 A1  Dec. 25, 2014

(30) Foreign Application Priority Data
Jun. 20, 2013  (JP) .................................. 2013-129760

(51) Int. Cl.
G06F 19/00 (2011.01)
G05B 19/409 (2006.01)

(52) U.S. Cl.
CPC ... G05B 19/409 (2013.01); *G05B 2219/35324* (2013.01); *G05B 2219/35336* (2013.01); *G05B 2219/35494* (2013.01)

(58) Field of Classification Search
CPC .......... G05B 2219/35324; G05B 2219/35336; G05B 19/35494; G05B 19/409

USPC ........................................................ 700/174
See application file for complete search history.

(56) References Cited

U.S. PATENT DOCUMENTS

| | | | | |
|---|---|---|---|---|
| 2002/0173721 A1* | 11/2002 | Grunwald | ................ | A61B 8/00 600/437 |
| 2003/0013959 A1* | 1/2003 | Grunwald | .............. | A61B 8/469 600/437 |
| 2004/0148136 A1* | 7/2004 | Sasaki | ................ | G05B 19/4065 702/188 |
| 2007/0037582 A1* | 2/2007 | Mohi | ..................... | G01C 21/20 455/456.1 |

FOREIGN PATENT DOCUMENTS

| | | |
|---|---|---|
| CN | 102981448 A | 3/2013 |
| JP | S63-271504 A | 11/1988 |
| JP | S63-282504 A | 11/1988 |
| JP | H01-236309 A | 9/1989 |
| JP | H07-325612 A | 12/1995 |
| JP | H11-231918 A | 8/1999 |

* cited by examiner

*Primary Examiner* — Mohammad Ali
*Assistant Examiner* — Ziaul Karim
(74) *Attorney, Agent, or Firm* — Drinker Biddle & Reath LLP

(57) ABSTRACT

A numerical control unit of a machine tool includes, a unit configured to analyze each function from a machining program, and, a unit configured to automatically switch a screen to the screen for each function stored in advance in accordance with change of the function of the machining program being executed.

1 Claim, 17 Drawing Sheets

N8 G00 X1000.0Z1400.0 ;  ⟵──────────── (A)

N9 T33;

N11 X400.0Z1050.0;

N12 G50S3000 ; (SPECIFY MAXIMUM NUMBER OF REVOLUTIONS)

N13 G96S200 ;  (SURFACE SPEED: 200 m/min)  ⟵── (B) START OF CONSTANT SURFACE SPEED CONTROL

N14 G01 Z 700.0F1000 ;

N15 X600.0Z 400.0;

N16 Z ... ;

:

N100 G97;  ⟵──────────── (C) END OF CONSTANT SURFACE SPEED CONTROL

N101 T34

:

(A) N8 TO N12

(B) N13 TO N100

(C) N101 AND THEREAFTER

N003 G68.2I0J0K45.0; ← (B) START OF TILTED WORKING PLANE INDEXING

N004 G53.1;

N005 G01X20.0Y30.0;

N006 G43.4L1P3X0Y0Z0B0C0H1; ← (C) START OF HIGH-SPEED SMOOTH TCP

N007 X0.001Y0.002Z0.001B0.210C0.321;

N008 X0.001Y0.002Z0.001B0.210C0.321;

N009 X0.001Y0.002Z0.001B0.210C0.321;

:

N097 X0.001Y0.002Z0.001B0.210C0.321;

N098 X0.001Y0.002Z0.001B0.210C0.321;

N099 X0.001Y0.002Z0.001B0.210C0.321;

N100 G49; ← (D) END OF HIGH-SPEED SMOOTH TCP

N101 G01X0Y0

N102 G69; ← (E) END OF TILTED WORKING PLANE INDEXING

N103 G00Z0;

:

(A) N1 AND N2

N002 G05.1Q1R5; ← (B) START OF AI CONTOUR CONTROL

N003 Y20.0;

N004 G68.2I0J0K45.0; ← (C) START OF TILTED WORKING PLANE INDEXING

N005 G53.1;

N006 G01X20.0Y30.0;

N007 G43.4L1P3X0Y0Z0B0C0H1; ← (D) START OF HIGH-SPEED SMOOTH TCP

N008 X0.001Y0.002Z0.001B0.210C0.321;
N009 X0.001Y0.002Z0.001B0.210C0.321;
:
N097 X0.001Y0.002Z0.001B0.210C0.321;
N098 X0.001Y0.002Z0.001B0.210C0.321;
N099 X0.001Y0.002Z0.001B0.210C0.321;

} AI CONTOUR CONTROL, TILTED WORKING PLANE INDEXING, AND HIGH-SPEED SMOOTH TCP ARE PERFORMED SIMULTANEOUSLY

N100 G49; ← (E) END OF HIGH-SPEED SMOOTH TCP

N101 G01X0Y0

N102 G69; ← (F) END OF TILTED WORKING PLANE INDEXING

N103 G00Z0;

N104 G05.1Q0; ← (G) END OF AI CONTOUR CONTROL

N105 S0;

:

(A) N1

(B) N2

(C) N4

(D) N7

(D) N7 TO N99

NUMERICAL CONTROL UNIT HAVING SCREEN DISPLAY SWITCHING FUNCTION FOLLOWING NC PROGRAM

RELATED APPLICATION DATA

This application claims priority under 35 U.S.C. §119 and/or §365 to Japanese Application No. 2013-129760 filed Jun. 20, 2013, the entire contents is incorporated herein by reference.

BACKGROUND OF THE INVENTION

1. Field of the Invention

The present invention relates to a control unit of a machine tool that controls the machine tool of a machining center or the like, and in particular, relates to a numerical control unit having a screen display switching function following an NC program.

2. Description of the Related Art

Various functions such as positioning and straight feeding are prepared for a numerical control unit that controls machine tools, that is, CNC. An operator executes control so that a machine tool performs a desired operation by creating a machining program that describes a plurality of instructions to execute a function prepared for CNC and executing the machining program. Situations in which the operator wants to check whether the machine tool performs a desired operation based on a created machining program or not arise frequently.

The operation to be checked of the machine tool or machine is represented by a created machining program. A large amount of information representing the operation to be checked of the machine tool or machine may not be displayed on one screen and the operator displays a desired screen by switching the screen to obtain information.

Thus, a plurality of screens representing a machine operation exists and it is necessary to store a method of switching the screen on which desired information is displayed and to perform a switching operation to the screen manually for the operator who checks the created program to display the desired information. Therefore, it is difficult for a novice user to perform the operation and in addition, the number of screen switching operations increases, leading to deterioration of operability.

As disclosed by JP 11-231918 A, an apparatus that saves the operator trouble during execution of a machining program is known. In the apparatus described in JP 11-231918 A, a screen switching command to the specified screen is described in a machining program and the operator is enabled to check the operation of a machine without any operation by the screen being switched based on the command during execution of the machining program.

However, in a configuration that a screen switching operation is instructed in the machining program like the apparatus disclosed by JP 11-231918 A, time and effort for a creator of the machining program to determine the screen to be displayed and to actually write the screen in the program arises, which is inconvenient.

SUMMARY OF THE INVENTION

An object of the present invention is to provide a numerical control unit configured to control a machine tool and capable of automatically switching the screen in accordance with change of the function of a machining program being executed and reducing the number of screen switching operations of an operator of the machine tool to improve operability.

A control unit of a machine tool according to the present invention includes a unit configured to analyze each function from a machining program and a unit configured to automatically switch a screen to the screen for each of the functions stored in advance in accordance with change of the function of the machining program being executed.

A numerical control unit according to the present invention is a numerical control unit configured to control a machine tool based on a machining program in which operation modes and operation commands to control a servo motor, a spindle motor, and a peripheral device constituting the machine tool are instructed, and the numerical control unit includes a machining program analysis unit configured to analyze the machining program, an operation-mode-control execution unit configured to control the servo motor, the spindle motor, and the peripheral device based on the operation modes and the operation commands analyzed by the machining program analysis unit, an operation mode screen correspondence storage unit configured to store in advance the relations between an operation-mode-screen displaying operation conditions of the servo motor, the spindle motor, and the peripheral device prepared for each of the operation modes, and, operation mode, and an operation-mode-screen display unit configured to select the operation-mode-screen to be displayed, based on the operation-mode-screen relations, as operation-mode-screen, corresponding to the operation mode currently being executed obtained by the operation-mode-control execution unit, and display the selected operation-mode-screen in a display.

When a plurality of the operation modes is instructed by the machining program, the operation-mode-screen display unit may display the operation-mode-screens in an order of instructions of the operation mode such that the operation-mode-screen related to the operation mode instructed last is displayed on top of other screens. Further, the control unit may include a commanded-operation-mode storage unit that stores identification information of the operation mode in the order of instructions when the plurality of operation modes is instructed by the machining program, an operation mode command history display unit that displays the identification information of the operation mode stored in the commanded-operation-mode storage unit, and an operation mode selection unit configured to select the operation mode displayed in the operation mode command history display unit, wherein the operation mode selected is displayed in the operation-mode-screen display unit.

By including the above configuration, the present invention can provide a numerical control unit controlling a machine tool and capable of automatically switching the screen in accordance with change of the function of a machining program being executed and reducing the number of screen switching operations of an operator of the machine tool to improve operability.

BRIEF DESCRIPTION OF THE DRAWINGS

The above object and other objects and features of the present invention will be apparent from the description of the following embodiment with reference to appended drawings. Among these drawings:

FIG. 7 shows an example of the machining program that continuously executes a tilted working plane indexing and high-speed smooth TCP;

FIG. 13 shows an example of the machining program continuously executing an AI contour control command, the tilted working plane indexing, and the high-speed smooth TCP;

DETAILED DESCRIPTION OF THE PREFERRED EMBODIMENTS

Figure 1:
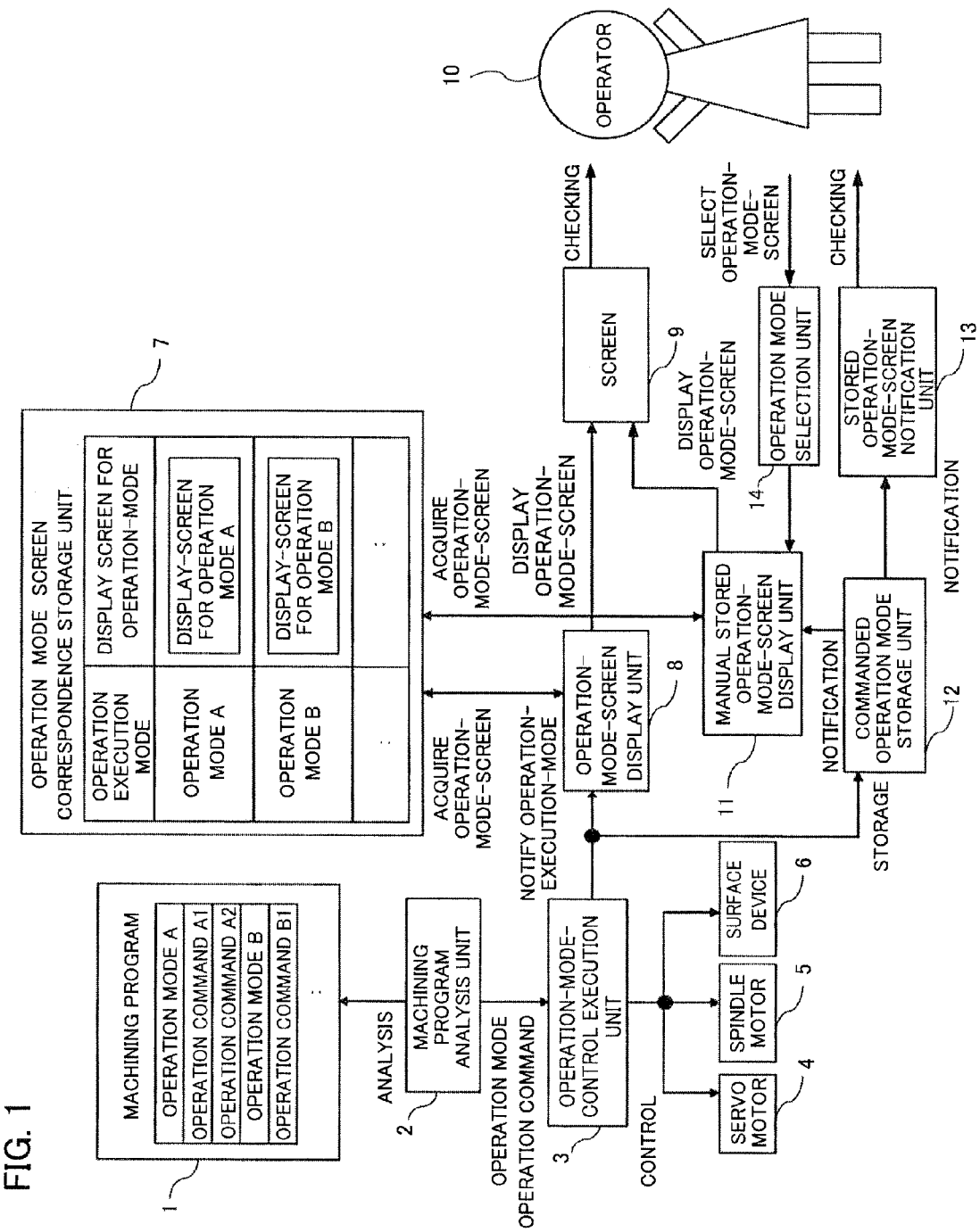
FIG. 1 shows the configuration of a control unit of a machine tool according to an embodiment of the present invention.

FIG. 1 shows the configuration of an embodiment. Various operation modes and operation commands to control a machine tool are described in a machining program 1. In the machining program shown in FIG. 1, these operation modes are described as an operation mode A, an operation command A.1, an operation command A.2, an operation mode B, an operation command B.1 and the like. The machine tool includes a servo motor 4 and a spindle motor 5 in a mechanism unit and also includes a peripheral device 6 such as an apparatus that supplies a coolant liquid.

A machining program analysis unit 2 in a numerical control unit analyzes the machining program 1 and notifies an operation-mode-control execution unit 3 of various operation modes and operation commands described in the machining program 1 in the order of description. The operation-mode-control execution unit 3 controls the whole machine tool by controlling the servo motor 4, the spindle motor 5, and the peripheral device 6 according to the notified operation modes and operation commands. Further, the operation-mode-control execution unit 3 notifies an operation-mode-screen display unit 8 of the operation mode currently being executed.

The operation-mode-screen display unit 8 acquires the operation-mode-screen to be displayed by referring to an operation-mode-screen correspondence storage unit 7 based on the notified operation mode currently being executed. The operation-mode-screen display unit 8 displays the acquired operation-mode-screen on a display 9.

In the above embodiment, the whole screen is switched in accordance with an execution state of the machining program 1, but in the operation-mode-screen display unit 8, a partial region inside the screen may be switched. The whole screen is switched or a portion of the screen is switched, in accordance with the design of the operation-mode-screen.

The operation-mode-control execution unit 3 notifies, in addition to the operation-mode-screen display unit 8, a commanded-operation-mode storage unit 12 of the operation mode currently being executed. The commanded-operation-mode storage unit 12 stores the commanded-operation-mode in the order of notification. The commanded-operation-mode storage unit 12 notifies a stored operation-mode-screen notification unit 13 and a manual stored operation-mode-screen display unit 11 of a plurality of stored commanded operation modes. The stored operation-mode-screen notification unit 13 corresponds to an operation mode command history display unit described in claims.

An operator 10 can check content of the stored commanded operation modes through the stored operation-mode-screen notification unit 13. Also, the operator 10 can select the operation mode through an operation mode selection unit 14 to make a request of the display thereof to the manual stored operation-mode-screen display unit 11. The manual stored operation-mode-screen display unit 11 acquires the operation-mode-screen to be displayed by referring to the operation mode screen correspondence storage unit 7 based on the requested operation mode. The manual stored operation-mode-screen display unit 11 displays the acquired operation-mode-screen on the display-screen, that is, the display 9 of a display apparatus.

According to the present embodiment, even if a plurality of operation modes is executed in a machining program to switch to an operation-mode-screen that is not desired by the operator, the screen can be switched by selecting only operation-mode-screens based on operation modes stored in a commanded-operation-mode storage unit.

Display examples are shown below by taking three machining programs as examples.

Figures 2, 3:
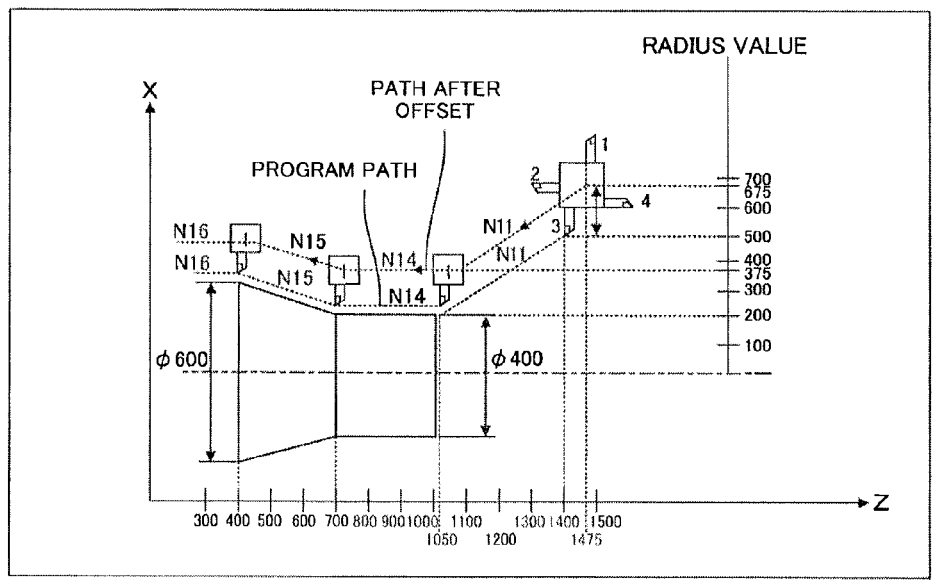
FIG. 2 shows workpiece machining by a machining program containing a block executing constant surface speed control.
FIG. 3 shows an example of the machining program containing the block executing constant surface speed control.

FIG. 2 shows workpiece machining by a machining program containing a block executing constant surface speed control. A tool moves along the programmed path to machine a workpiece. FIG. 3 shows an example of the machining program containing the block of executing constant surface speed control that performs machining in FIG. 2. Examples of the display-screen displayed on the display 9 when machining indicated by a symbol A, a symbol B, and a symbol C in FIG. 3 is performed are shown in FIGS. 4, 5, and 6 respectively.

Figure 4:
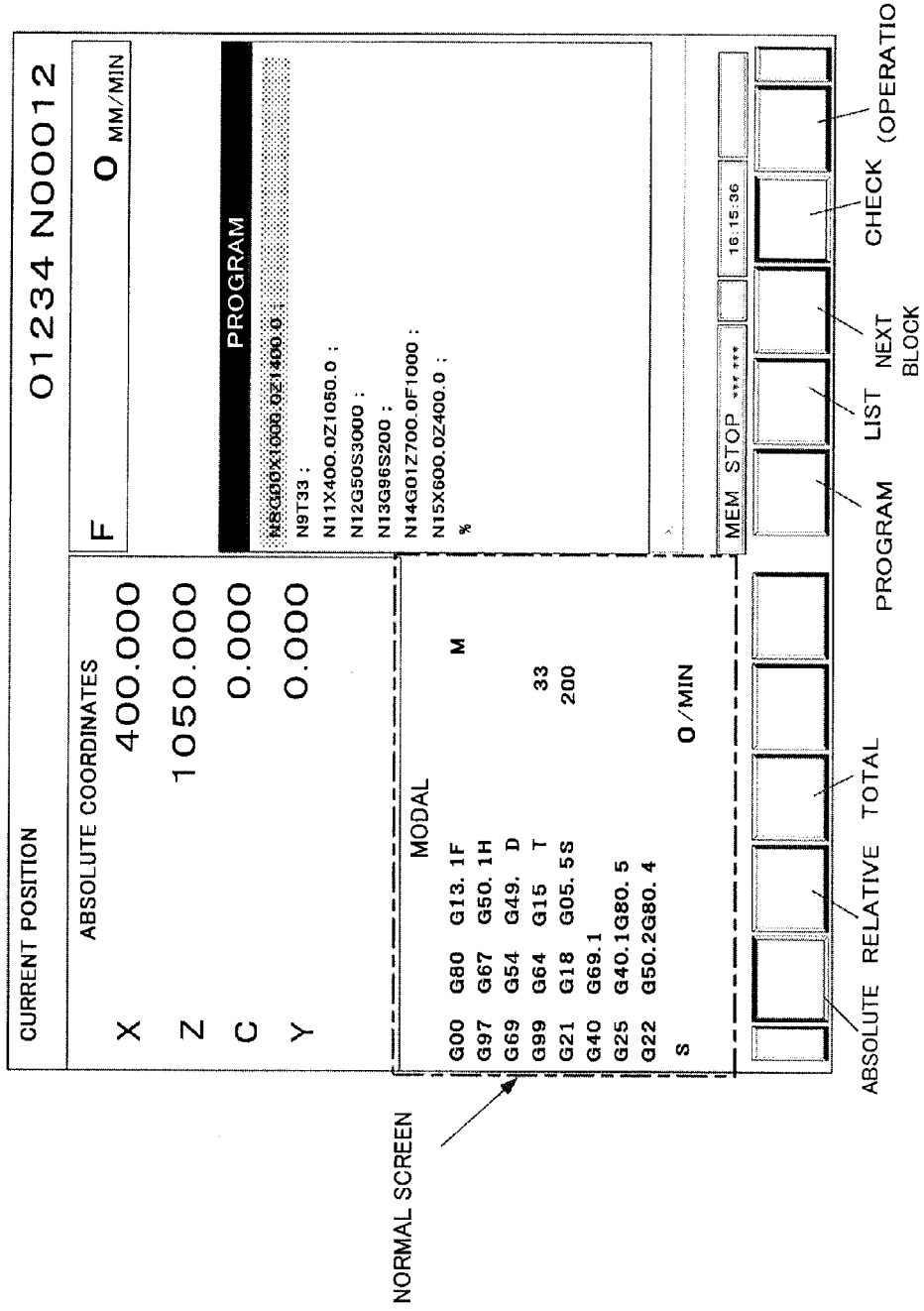
FIG. 4 shows a display-screen example during execution of blocks N8 to N12 of the machining program in FIG. 3.

FIG. 4 shows a display-screen example during execution of blocks N8 to N12 of the machining program shown in FIG. 3. In the machining program shown in FIG. 3, a normal screen is displayed during execution of the block N8 to the block N12.

Figure 5:
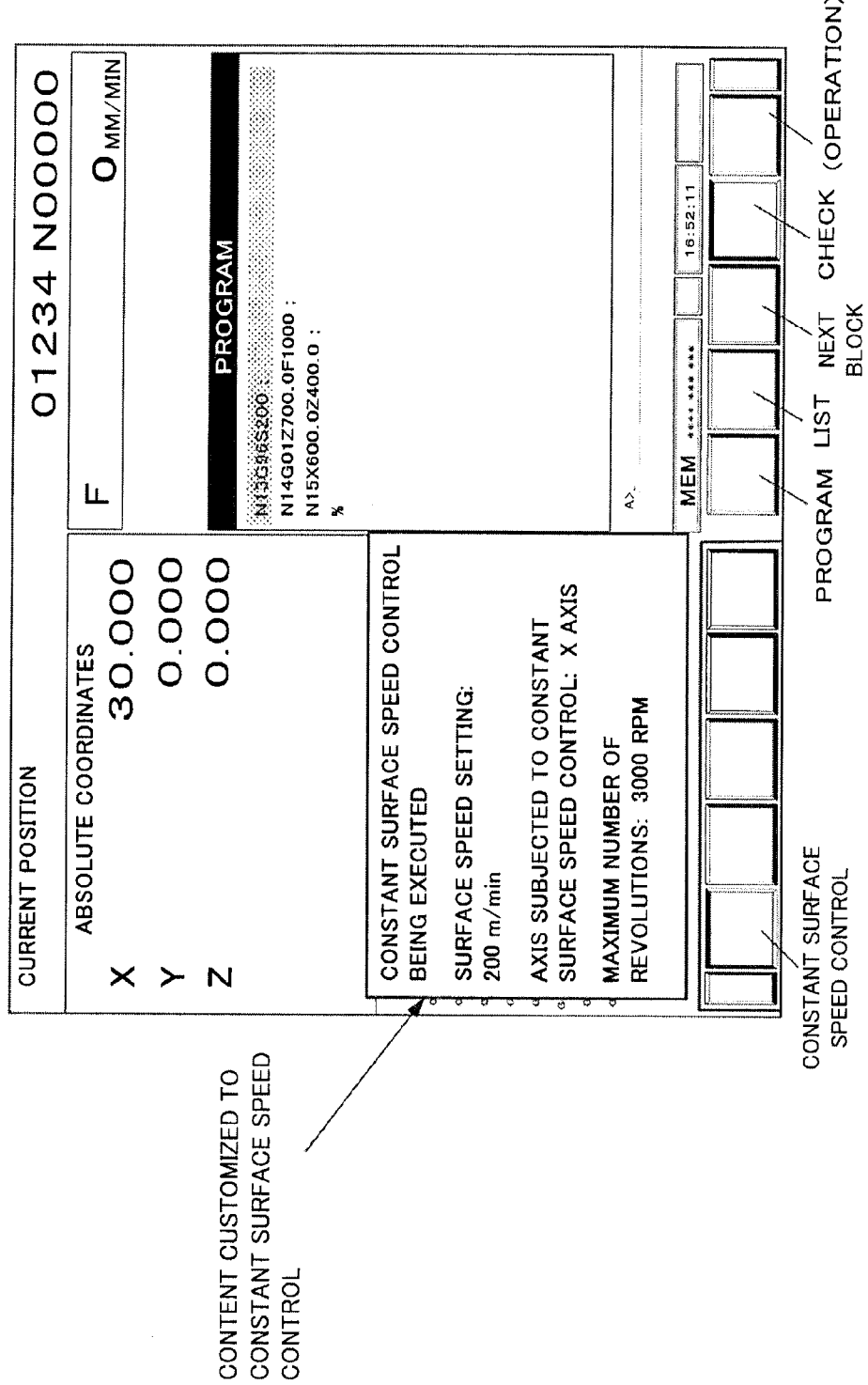
FIG. 5 shows a display-screen during execution of blocks N13 to N100 of the machining program in FIG. 3.

FIG. 5 shows a display-screen example during execution of blocks N13 to N100 of the machining program shown in FIG. 3. In the machining program shown in FIG. 3, the blocks N13 to N100 are under the constant surface speed control and thus, as shown in FIG. 5, a screen customized to the constant surface speed control is displayed.

Figure 6:
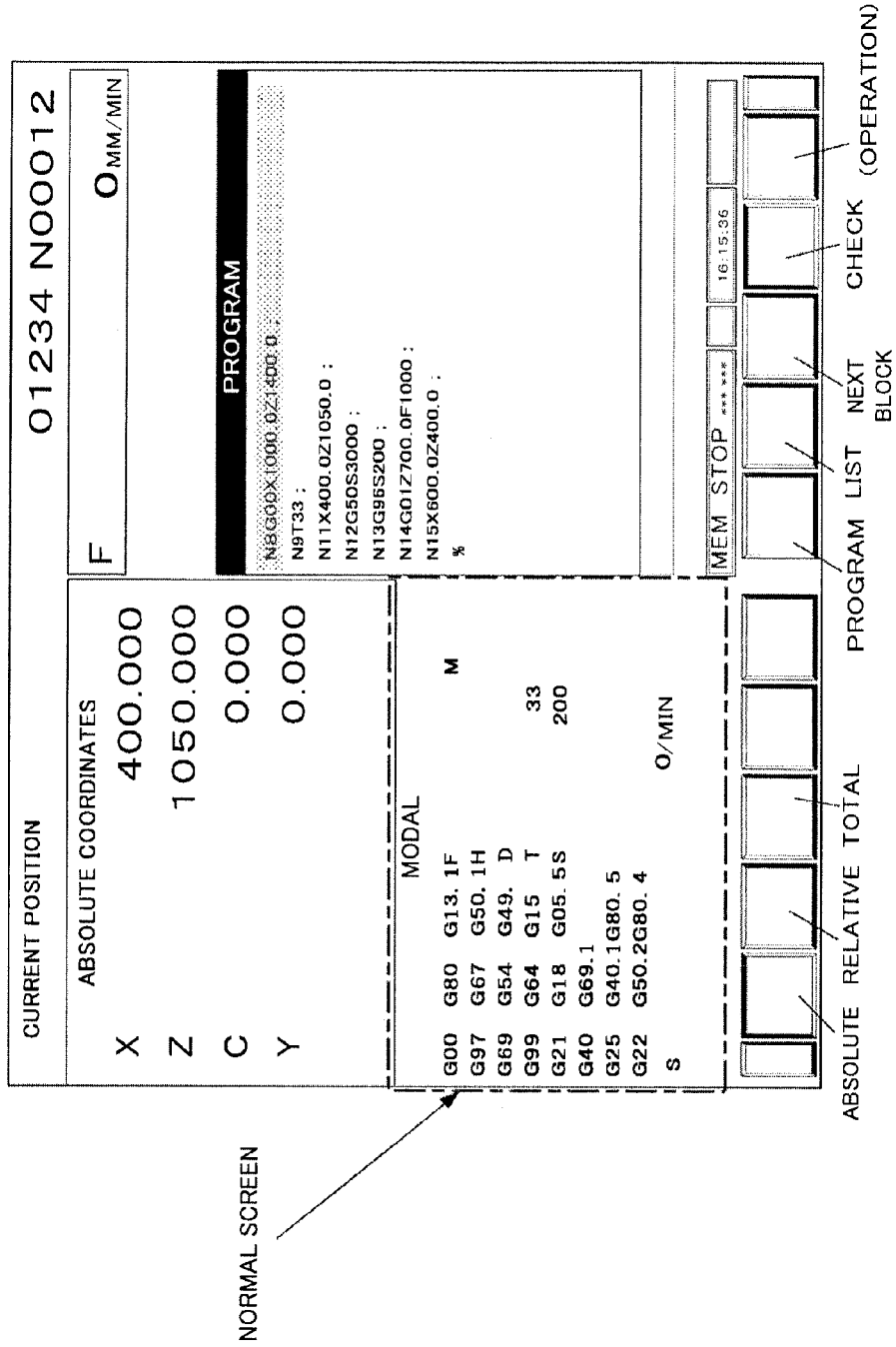
FIG. 6 shows a display-screen example during execution of a block N101 of the machining program in FIG. 3 and thereafter.

FIG. 6 shows a display-screen example during execution of a block N101 of the machining program shown in FIG. 3 and thereafter. In the machining program shown in FIG. 3, a normal screen is displayed in the block N101 and thereafter.

FIG. 7 shows an example of the machining program that continuously executes a tilted working plane indexing and high-speed smooth TCP. Examples of the display-screen displayed on the display 9 when machining indicated by a symbol A, a symbol B, a symbol C, a symbol D, and a symbol E in FIG. 7 is performed, are shown in FIGS. 8, 9, 10, 11, and 12 respectively.

Figure 8:
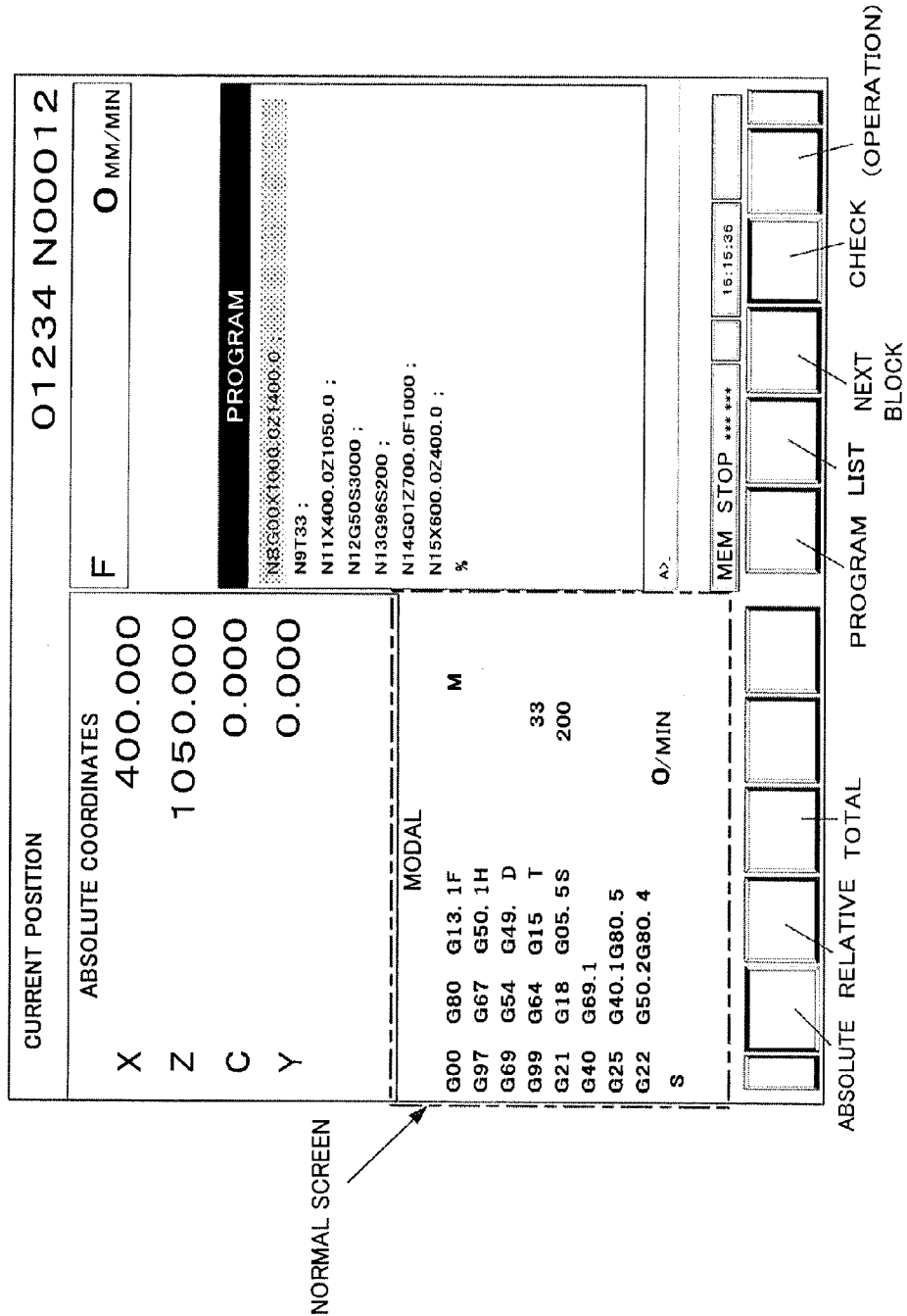
FIG. 8 shows a display-screen example during execution of blocks N001 and N002 of the machining program in FIG. 7.

FIG. 8 shows a display-screen example during execution of blocks N001 and N002 of the machining program shown in FIG. 7. A normal screen is displayed during execution of the blocks N001 and N002.

Figure 9:
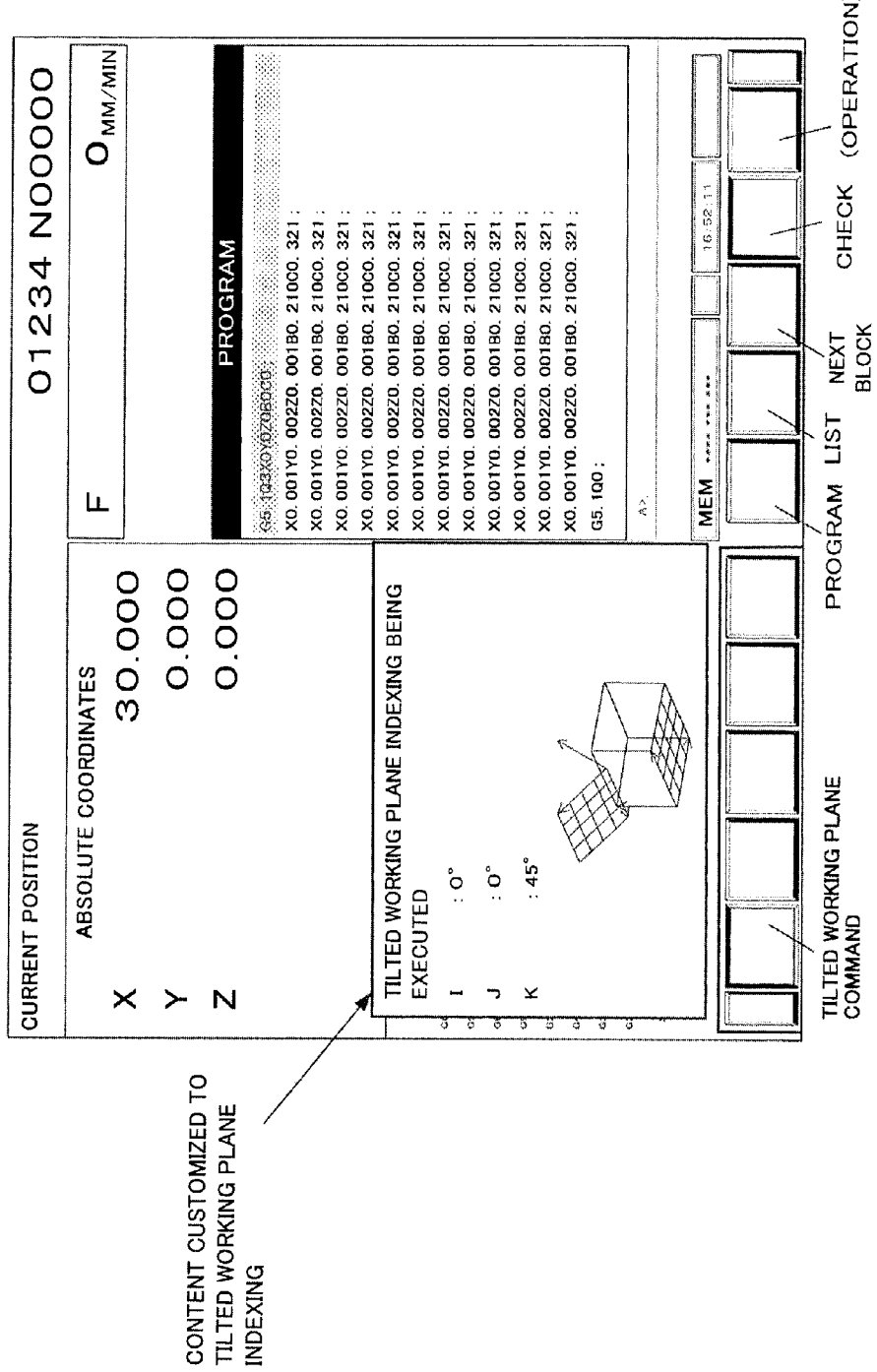
FIG. 9 shows that a screen customized to a tilted working plane indexing is displayed, when the tilted working plane indexing of a block N003 of the machining program in FIG. 7 is executed.

As shown in FIG. 9, a screen customized to a tilted working plane indexing is displayed, when the tilted working plane indexing of a block N003 of the machining program shown in FIG. 7 is executed. When an NC program starts the tilted working plane indexing, that is, when the control unit analyzes the machining program and starts a block of the tilted working plane indexing, content customized to the tilted working plane indexing is displayed.

Figure 10:
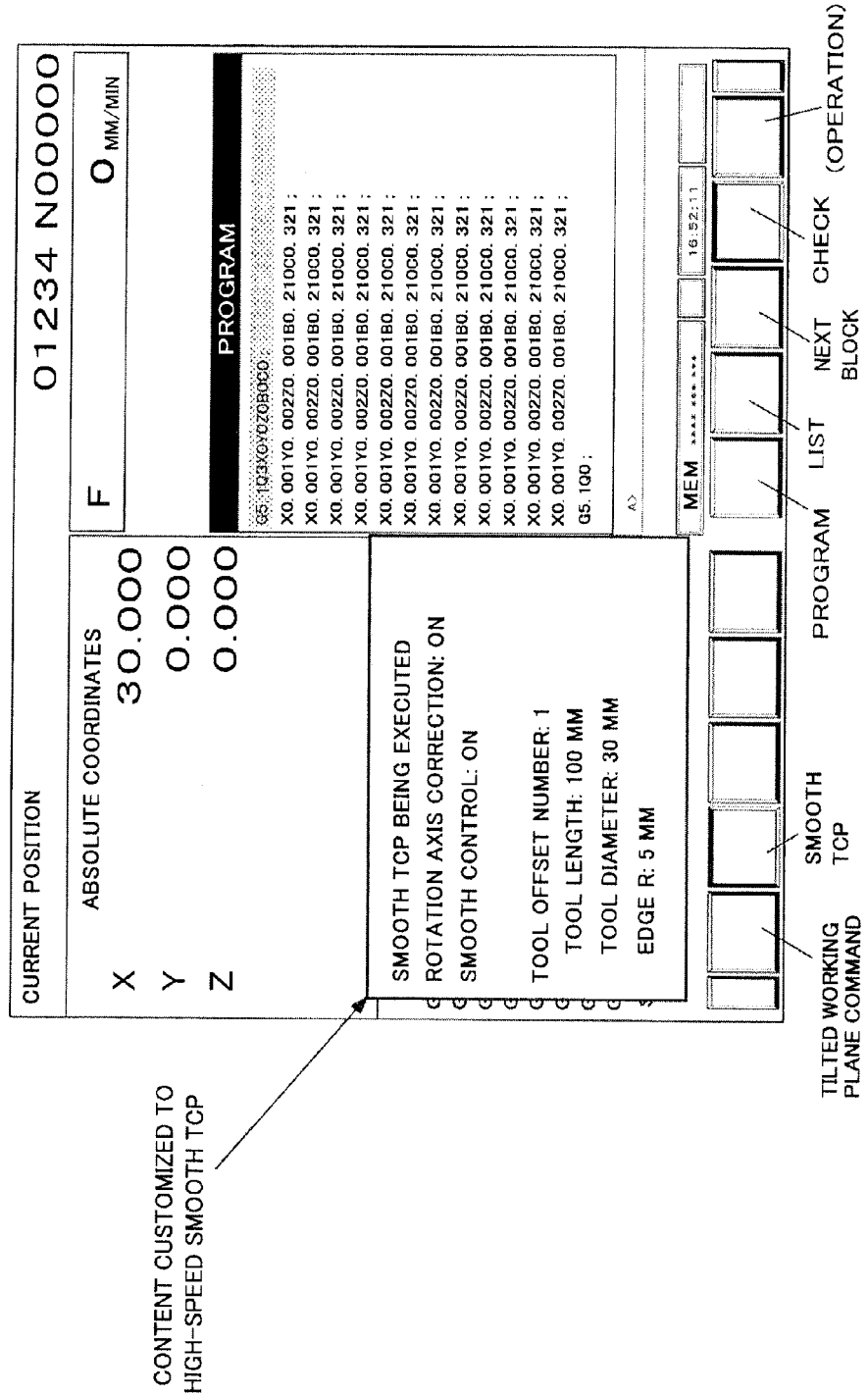
FIG. 10 shows that a screen customized to high-speed smooth TCP is displayed, when the high-speed smooth TCP of a block N006 of the machining program in FIG. 7 is started.

As shown in FIG. 10, a screen customized to high-speed smooth TCP when the high-speed smooth TCP of a block N006 of the machining program shown in FIG. 7 is started, is displayed. When the NC program starts the high-speed smooth TCP, content customized to the high-speed smooth TCP is displayed.

Figure 11:
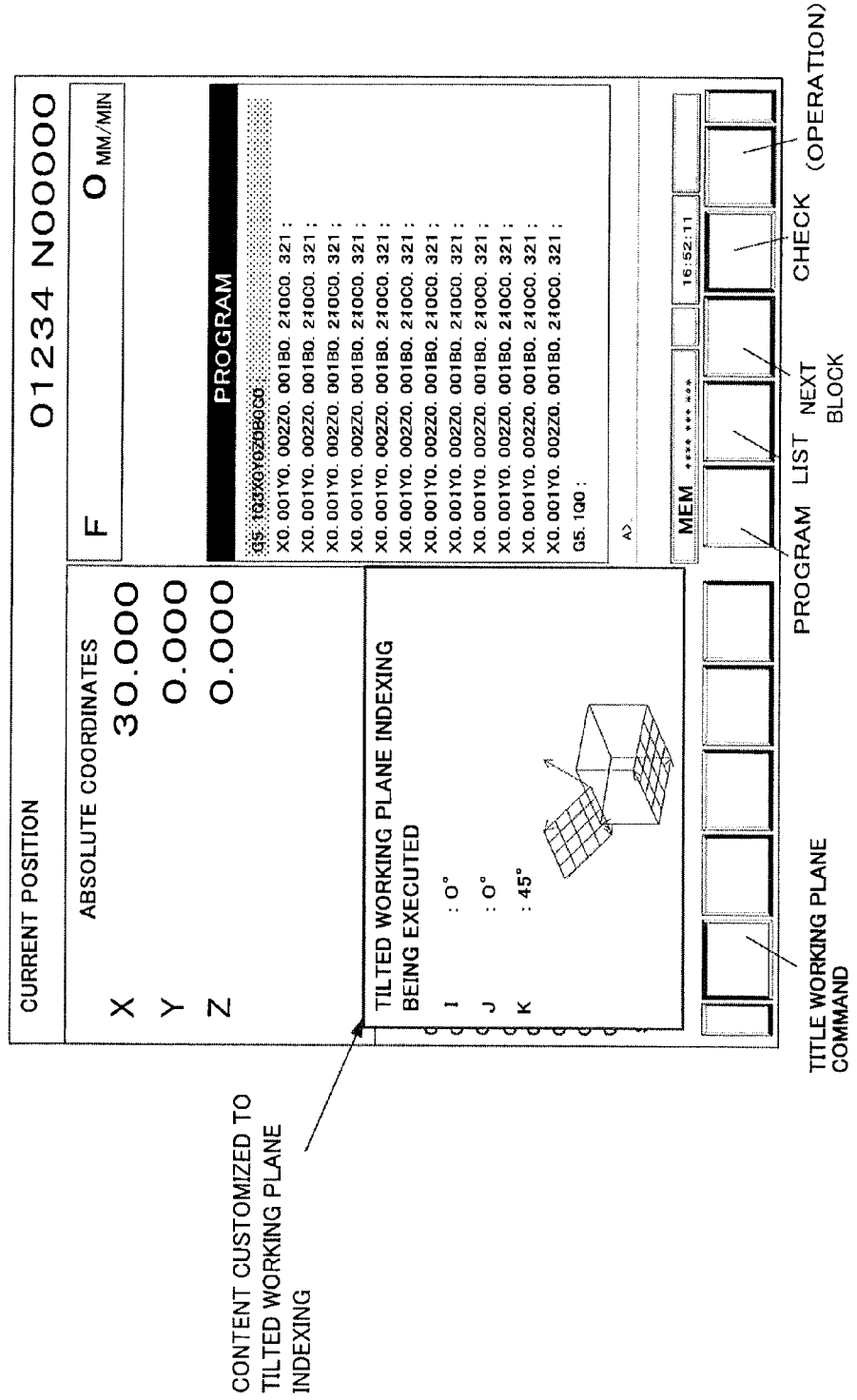
FIG. 11 shows that the high-speed smooth TCP ends in a block N100 of the machining program in FIG. 7 to return to a screen for tilted working plane indexing.

As shown in FIG. 11, the high-speed smooth TCP ends in a block N100 of the machining program shown in FIG. 7 to return to a screen for tilted working plane indexing. When the NC program ends the high-speed smooth TCP, the display returns to the content of the tilted working plane indexing displayed last time.

Figure 12:
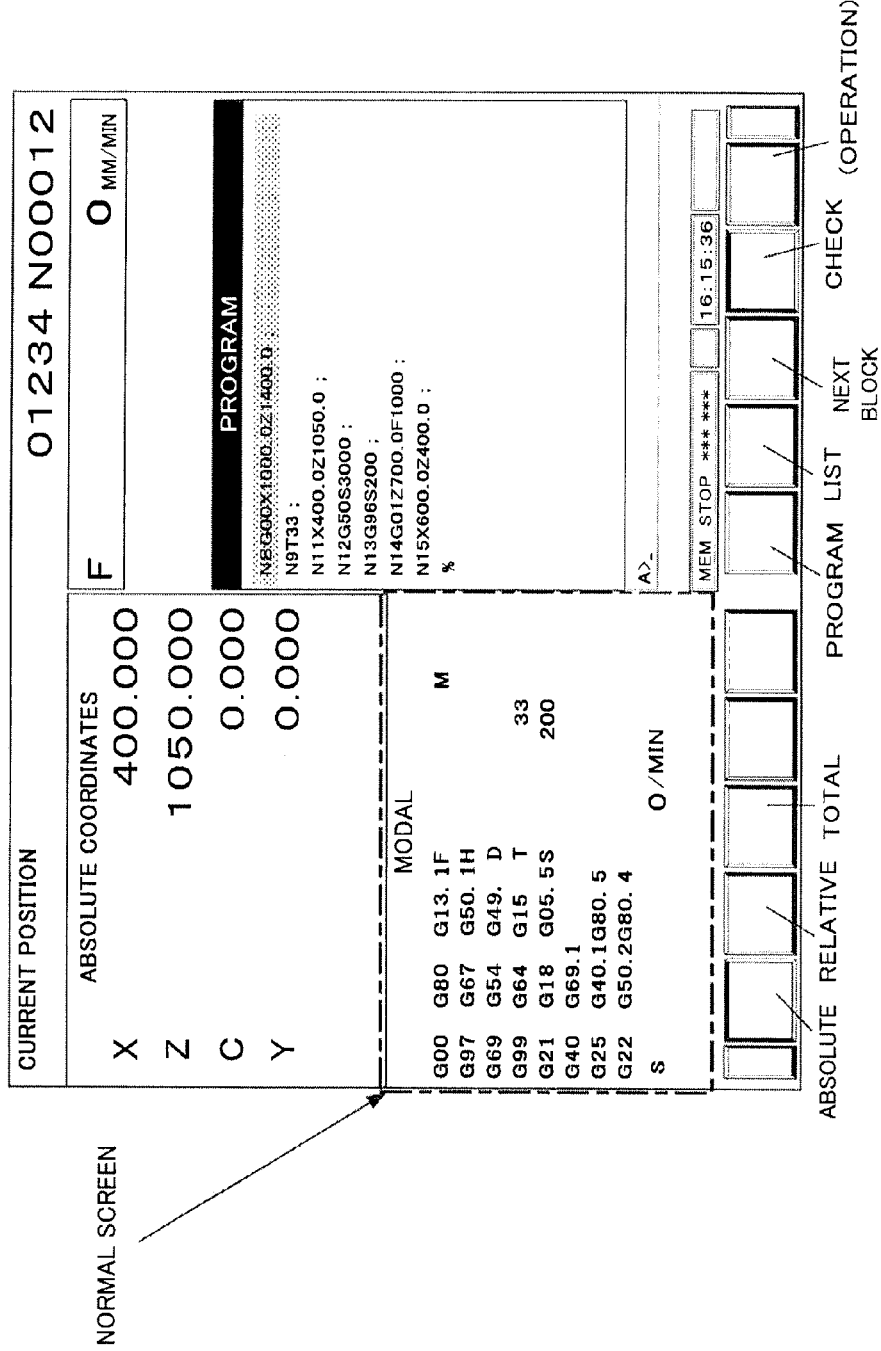
FIG. 12 shows that the tilted working plane indexing ends in a block N102 of the machining program in FIG. 7 to return to a normal screen.

As shown in FIG. 12, the tilted working plane indexing ends in a block N102 of the machining program shown in FIG. 7 to return to the normal screen.

FIG. 13 shows an example of the machining program continuously executing an AI contour control command, the tilted working plane indexing, and the high-speed smooth TCP. Examples of the display-screen displayed on the display 9 when machining indicated by a symbol A, a symbol B, a symbol C, and a symbol D in FIG. 13 is performed, are shown in FIGS. 14, 15, 16, and 17 respectively. Further, an example in which the display is manually switched by the operation mode selection unit 14 when machining shown between the symbol D and a symbol E is performed, is shown in FIG. 18.

Figure 14:
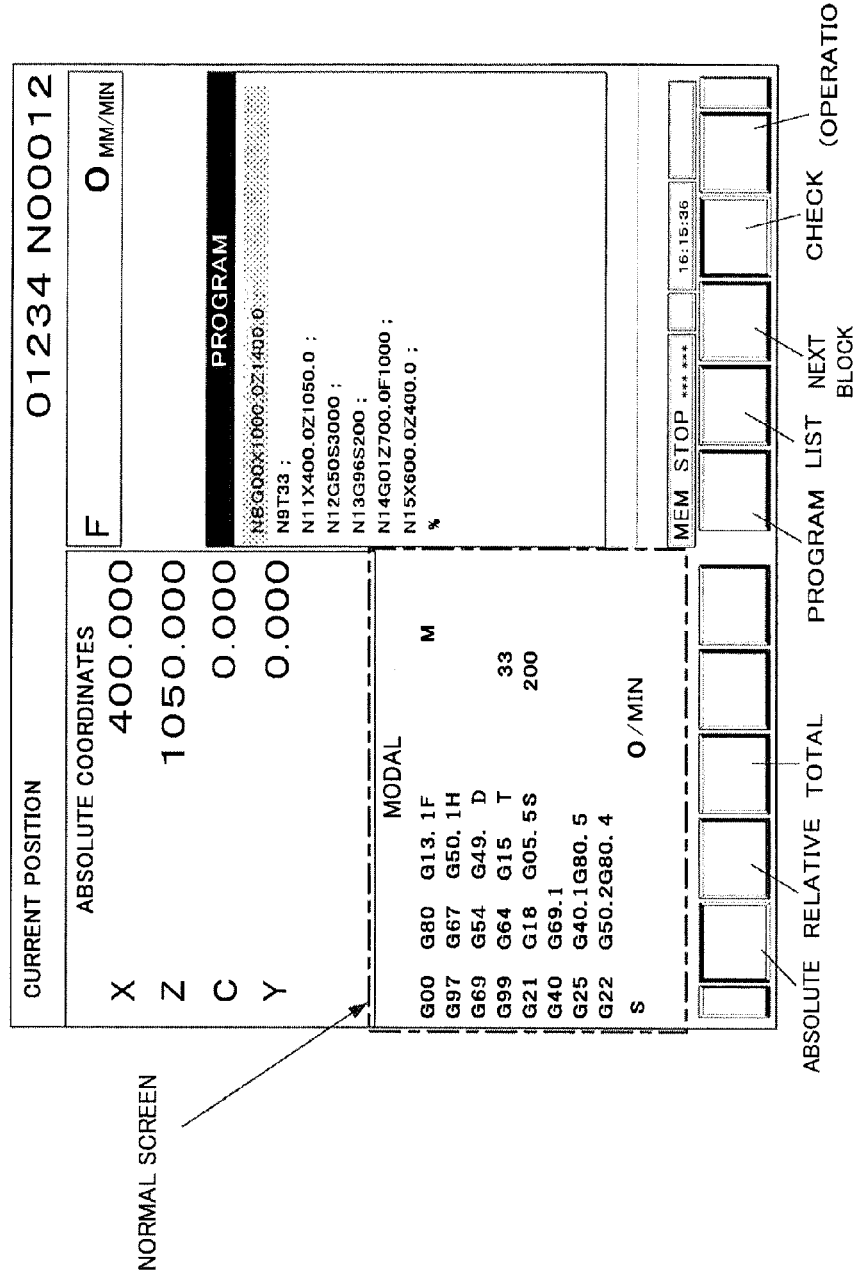
FIG. 14 shows a display-screen example during execution of a block N001 of the machining program in FIG. 13.

FIG. 14 shows a display-screen example during execution of a block N001 of the machining program shown in FIG. 13.

Figure 15:
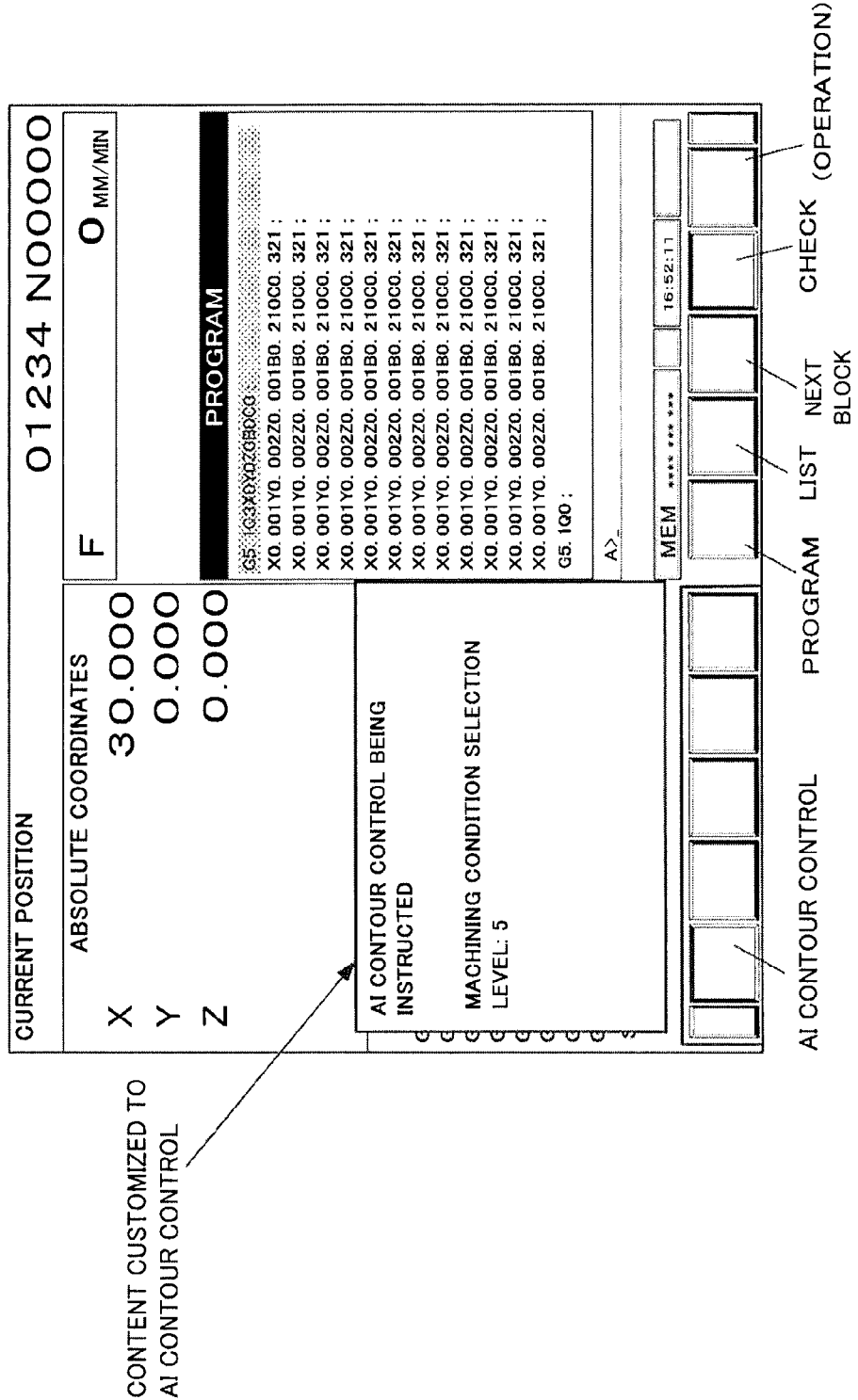
FIG. 15 shows that a screen customized to the AI contour control command when the AI contour control is instructed in a block N002 of the machining program in FIG. 13 is displayed.

As shown in FIG. 15, a screen customized to the AI contour control command is displayed, when the AI contour control is instructed in a block N002 of the machining program shown in FIG. 13.

Figure 16:
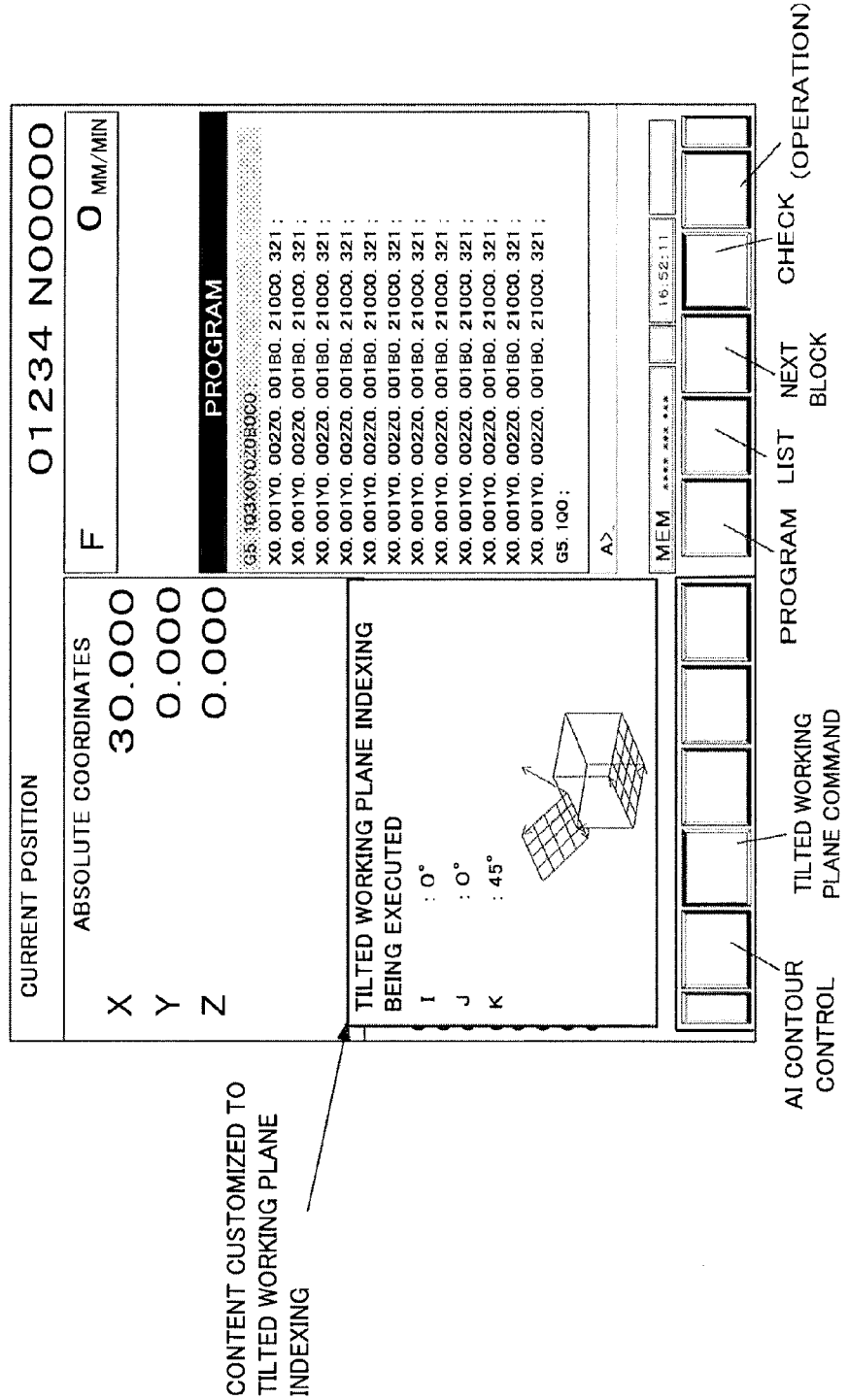
FIG. 16 shows that the tilted working plane indexing is instructed in a block N004 of the machining program in FIG. 13 and a screen customized to the tilted working plane indexing is displayed.

As shown in FIG. 16, the tilted working plane indexing is instructed in a block N004 of the machining program shown in FIG. 13 and a screen customized to the tilted working plane indexing is displayed.

Figure 17:
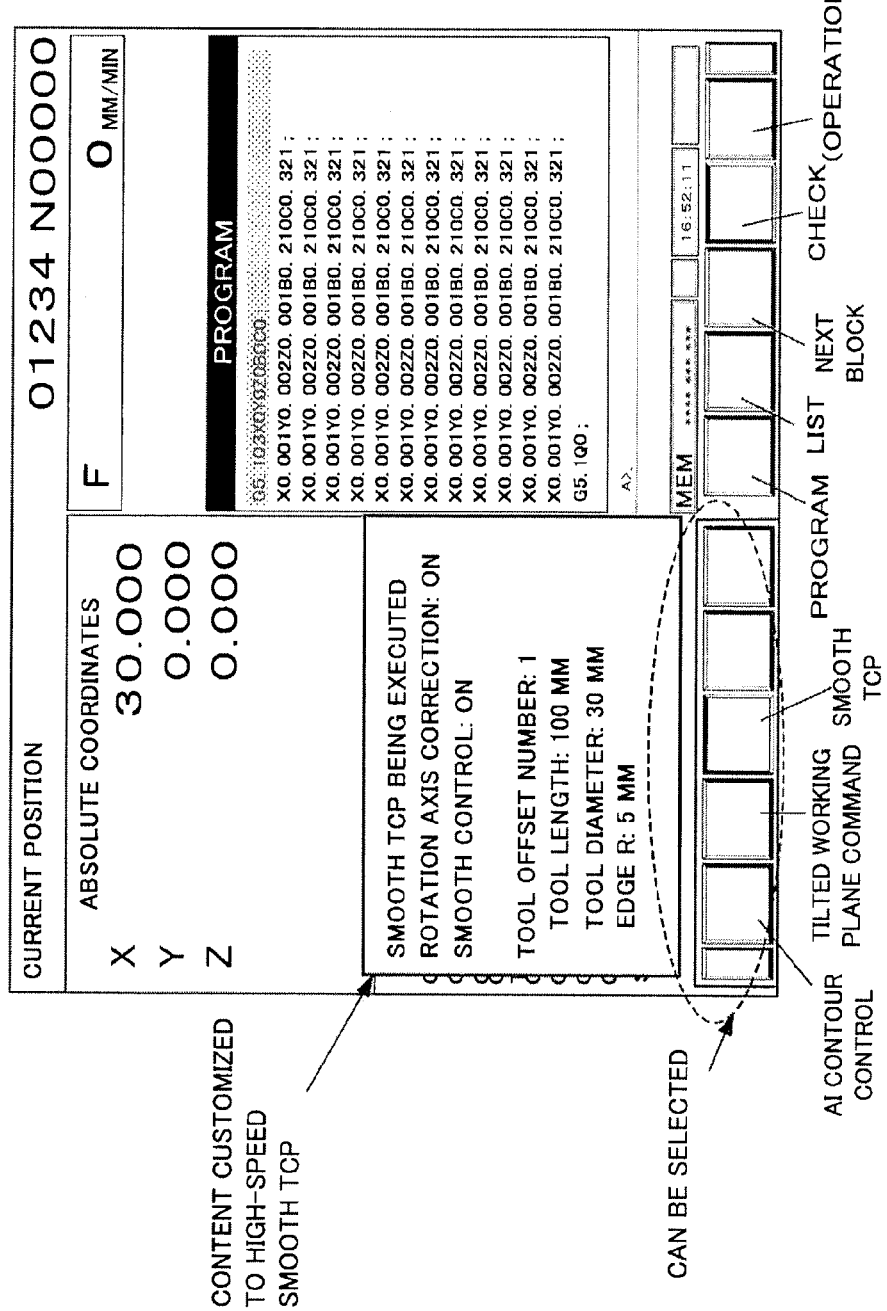
FIG. 17 shows that the high-speed smooth TCP is started in a block N007 of the machining program in FIG. 13 and a screen customized to the high-speed smooth TCP is displayed.
Figure 18:
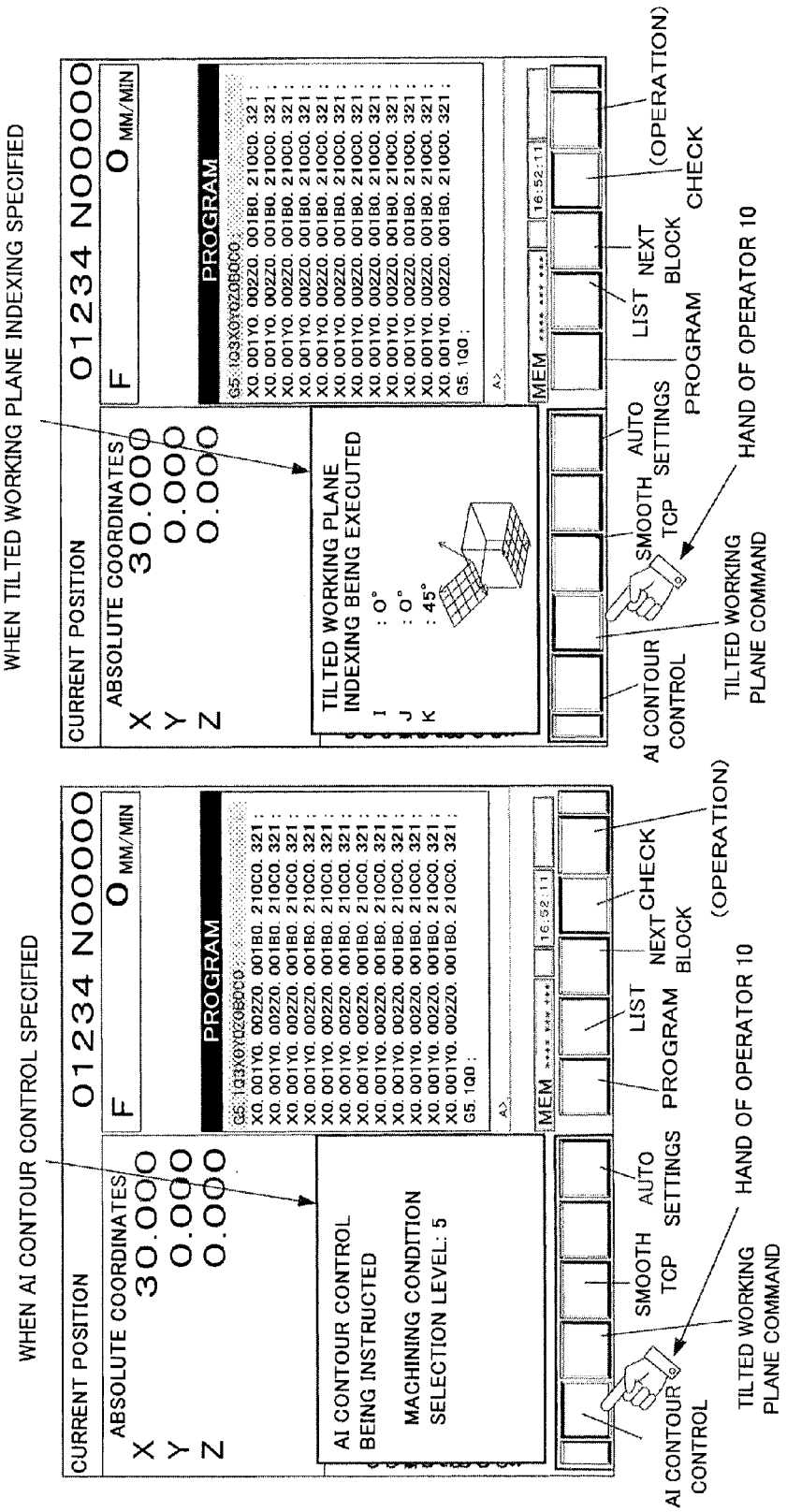
FIG. 18 shows that screen displays for AI contour control and tilted working plane indexing can be made manually in blocks N007 to N099 of the machining program in FIG. 13.

As shown in FIG. 17, the high-speed smooth TCP is started in a block N007 of the machining program shown in FIG. 13 and a screen customized to the high-speed smooth TCP is displayed. When the NC program starts the high-speed smooth TCP, content customized to the high-speed smooth TCP is displayed. Also, as shown in FIG. 17, each operation mode that has been executed is displayed in the order of execution and this corresponds to the operation mode command history display unit. The operator 10 can cause the display 9 to display the operation mode desired to be displayed by selecting the button in which each operation mode is displayed. Selecting the button in which each operation mode is displayed by the operator 10 corresponds to the operation mode selection unit. Incidentally, the display of the operation mode command history and the buttons for selecting the operation mode may be arranged separately.

As shown in FIG. 18, screen displays for AI contour control and tilted working plane indexing can be made manually in blocks N007 to N099 of the machining program shown in FIG. 13. In the machining program shown in FIG. 13, the AI contour control, the tilted working plane indexing, and the high-speed smooth TCP are performed simultaneously. At this point, the screen of the high-speed smooth TCP is displayed on top of other screens, but the screens of the AI contour control and the tilted working plane indexing can also be manually switched and displayed.

The invention claimed is:

1. A numerical control unit that controls a machine tool based on a machining program in which operation modes and operation commands to control a servo motor, a spindle motor, and a peripheral device constituting the machine tool are instructed, the numerical control unit comprising:
    a machining program analysis unit configured to analyze the machining program;
    an operation-mode-control execution unit configured to control the servo motor, the spindle motor, and the peripheral device based on the operation modes and the operation commands analyzed by the machining program analysis unit;
    an operation mode screen correspondence storage unit configured to store in advance the relations between an operation-mode-screen displaying operation conditions of the servo motor, the spindle motor, and the peripheral device prepared for each of the operation modes, and, operation mode;
    an operation mode screen display unit configured to select the operation-mode-screen to be displayed, based on the operation mode screen relations, as an operation-mode-screen, corresponding to the operation mode currently being executed obtained by the operation mode control execution unit, and display the selected operation-mode-screen in a display;
    a commanded-operation-mode storage unit configured to store identification information of the operation modes in the order of instructions when the plurality of operation modes is instructed by the machining program;

an operation mode command history display unit configured to display the identification information of the operation mode stored in the commanded-operation-mode storage unit; and an operation mode selection unit configured to select the operation mode displayed in the operation mode command history display unit, wherein the operation-mode-screen display unit is further configured to display the operation-mode-screens corresponding to the operation mode selected; and wherein the numerical control unit is capable of automatically displaying an operation-mode-screen in accordance with the operation mode being executed.

* * * * *